(12) United States Patent
Stefanoni et al.

(10) Patent No.: US 10,941,343 B2
(45) Date of Patent: Mar. 9, 2021

(54) FOAMING ADDITIVE FOR SOIL CONDITIONING IN THE PRESENCE OF MECHANISED EXCAVATION FOR TUNNEL CONSTRUCTION

(71) Applicant: MAPEI S.P.A., Milan (IT)

(72) Inventors: Massimo Stefanoni, Milan (IT); Carlo Pistolesi, Milan (IT); Marco Squinzi, Milan (IT); Enrico Dal Negro, Milan (IT); Cristiano Maltese, Milan (IT); Daniele Peila, Turin (IT)

(73) Assignee: MAPEI S.P.A., Milan (IT)

( * ) Notice: Subject to any disclaimer, the term of this patent is extended or adjusted under 35 U.S.C. 154(b) by 321 days.

(21) Appl. No.: 16/063,746

(22) PCT Filed: Dec. 6, 2016

(86) PCT No.: PCT/EP2016/079810
§ 371 (c)(1),
(2) Date: Jun. 19, 2018

(87) PCT Pub. No.: WO2017/108382
PCT Pub. Date: Jun. 29, 2017

(65) Prior Publication Data
US 2020/0270522 A1 Aug. 27, 2020

(30) Foreign Application Priority Data

Dec. 21, 2015 (IT) .................. 102015000085939

(51) Int. Cl.
*C09K 17/32* (2006.01)
*E21D 9/06* (2006.01)

(52) U.S. Cl.
CPC ............ *C09K 17/32* (2013.01); *E21D 9/0685* (2016.01)

(58) Field of Classification Search
CPC .............................. C09K 17/32; E21D 9/0685
See application file for complete search history.

(56) References Cited

U.S. PATENT DOCUMENTS 9,249,349 B2 * 2/2016 Gayral Chirac ....... C09K 8/703

FOREIGN PATENT DOCUMENTS

| CN | 103937469 A | 7/2014 |
|---|---|---|
| EP | 0400976 A1 | 12/1990 |
| GB | 2245292 A | 1/1992 |

OTHER PUBLICATIONS

Search Report and Written Opinion of PCT/EP2016/079810 dated Feb. 28, 2017.

* cited by examiner

*Primary Examiner* — Peter F Godenschwager
(74) *Attorney, Agent, or Firm* — Silvia Salvadori, P.C.; Silvia Salvadori

(57) ABSTRACT

Disclosed is a liquid foaming additive for use in mechanised excavation by a tunnel boring machine, containing 5-40% by weight of one or more surfactants, 0.01-5% by weight of one or more biopolymers, and 55-94.99% by weight of water.

2 Claims, No Drawings

FOAMING ADDITIVE FOR SOIL CONDITIONING IN THE PRESENCE OF MECHANISED EXCAVATION FOR TUNNEL CONSTRUCTION

This application is a U.S. national stage of PCT/EP2016/079810 filed on 6 Dec. 2016, which claims priority to and the benefit of Italian Application No. 102015000085939 filed on 21 Dec. 2015, the contents of which are incorporated herein by reference in their entireties.

The present invention relates to foaming additives used for conditioning soil excavated with a tunnel boring machine. Said additives can be classified as readily biodegradable, and are characterised by the long half-life of the foam generated, which gives rise to longer-lasting soil conditioning and better stability of the tunnel face. The additives described in the present invention possess high stability even in the presence of brine.

PRIOR ART

Currently, tunnels can be excavated by two main technologies:
use of explosives (the conventional method);
use of mechanical equipment.

The first method involves cyclical application of the operations described below, which allow the advance of the tunnel:

1) Using a Jumbo machine, a series of holes are drilled in the tunnel face and packed with explosive; the arrangement of the holes and the amount of explosive are calibrated in such a way as to demolish the desired portion of rock without damaging the portions thereof which will act as natural supports for the excavation;
2) The excavated material (called "muck") is removed with bulldozers and trucks;
3) The excavation is supported by ribs and shotcrete.

This method is based on eliminating the right portion of rock, so as to redistribute around the excavation the forces known as the "arch effect", which partly supports the consolidating action of the reinforcing rods and shotcrete.

The second construction technique can be divided into two main categories: the partial-face system and the full-face system (which involves excavating the entire tunnel diameter at the same time). In the first case, operations proceed as already described for the conventional method with roadheaders and rock breakers (instead of explosive), gradually forming the shape of the tunnel which will subsequently be lined with reinforced concrete. In the second case the advance is effected with a complex machine called a Tunnel Boring Machine (TBM), also known as a "mole", which, as well as performing the excavation, supports and prevents collapses of the face, carries away muck (by means of a screw conveyor and a conveyor belt), and places the final tunnel lining, consisting of prefabricated reinforced concrete segments. This type of machine can excavate nearly all types of geological material, including compact rock (hard-rock TBM), fractured rock (single or double-shield TBM), loose soil and under aquifers (EPB—Earth Pressure Balance machine).

A TBM consists of:
1) The head, namely the front part in direct contact with the tunnel face, which serves to excavate, support the face, collect and convey muck to an evacuation system;
2) A system for transporting the muck out of the tunnel (such as a conveyor belt);
3) A excavation chamber located between the cutterhead and the muck conveyance system in which the excavated material is collected; the material exits from the chamber on a screw conveyor or auger, and is placed on a roller conveyor.
4) A tunnel lining system.

The cutterhead is equipped with different tools and is designed based on the geology to be excavated. The tools are generally of three different types: cutters, scrapers and rippers.

In the TBM, the advance can take place with the excavation chamber constantly and completely full of suitably conditioned excavated material, in order to guarantee homogenous, uniform distribution of the soil pressure on the tunnel face and prevent pressure drops between one stroke and the next. In some cases, depending on the geological and hydraulic conditions, it is possible to advance with empty or partially empty excavation chamber. In the EPB-TBM it is common practice to apply a conditioning agent to the soil or rock excavated, in different portions of the TBM: tunnel face, excavation chamber and screw conveyor.

Known stabilising agents include bentonite and polymer suspensions. They can cause problems in some soils, because they considerably increase the water content of the soil, producing very liquid systems that are difficult to extract. Moreover some soils (such as clays) can become sticky and difficult to remove to the point of clogging the cutterhead, with a substantial loss of efficiency.

In the latest developments of this technology, polymer foams have been suggested. They have the considerable advantage that they greatly reduce the input of water into the soil. A standard foaming agent formulation comprises a foaming agent and a stabilising agent.

Thus, in operation, the foam is directly injected into the cutterhead at the excavation interface.

EP 1027528 discloses a boring method wherein the composition of the aqueous material injected into the tunnel face consists of a polyethylene oxide with a molecular weight ranging between 2 and 8 million and an anionic surfactant containing sulphate.

EP 0070074 describes a foaming additive consisting of an alkylpolysaccharide surfactant and a sulphate or sulphonate and/or carboxylate cosurfactant.

U.S. Pat. No. 5,851,960 discloses an excavation method that uses a drilling fluid consisting of a rehydrated clay, water and a foaming surfactant.

U.S. Pat. No. 6,172,010 discloses an aqueous foaming additive consisting of a surfactant and a polymer characterised by opposite charges, to obtain a stable foam.

U.S. Pat. No. 6,802,673 describes an aqueous foaming additive consisting of an anionic surfactant and a β-naphthalene sulphonate formaldehyde condensate.

U.S. Pat. No. 4,442,018 discloses the composition of an additive for the production of a stable foam in aqueous phase consisting of an acrylic acid polymer, a C12-C14 and C16 alcohol, a C4 and C5 alcohol, sodium laurylsulphate or alpha-olefin sulphonate, and water.

DESCRIPTION OF THE INVENTION

The present invention relates to a novel foaming additive designed to be added in percentages of 0.1-4% by weight to an aqueous solution, able to generate foam to be injected into the tunnel face. Said foam is used on the face to soften the soil and allow faster extraction, and in the conditioning chamber to maintain the stability of the tunnel face.

The high stability of the foam generated, expressed as half-life, allows the conditioning in the excavation chamber to be maintained for longer.

The additive according to the invention, in the form of an aqueous solution classifiable as readily biodegradable, comprises at least one surfactant in percentages ranging between 5 and 40% by weight, and at least one biopolymer in percentages ranging between 0.01 and 5% by weight. The percentage of water can range from 55% to 94.99% by weight. The surfactant can be anionic, cationic or non-ionic, preferably anionic. The preferred anionic surfactants are alkyl sulphate salts and alkyl heterosulphates, in particular the sodium salts. An alkyl ethoxy sulphate salt having a $C_{10}$-$C_{14}$ alkyl chain and an ethoxylation number ranging from 1 to 9 is particularly preferred as anionic surfactant.

The term "biopolymers" refers to polymers degradable due to the effect of micro-organisms such as bacteria, fungi or seaweed. They are mainly water-soluble polysaccharides able to increase the viscosity of an aqueous system in a pH range between 4 and 12. The preferred biopolymers are xanthan gum and guar gum.

The foaming additive according to the invention is classifiable as readily biodegradable according to the OECD 301 guidelines.

The foaming additive according to the invention is characterised by high stability, even in the presence of brine.

The foaming additive can also contain other compounds used to deal with specific problems such as clogging due to clayey soils, to prevent high consumption of the cutters fitted in the cutterhead, or to reduce the quantity of soluble salts in the water present in the excavation soil.

A further object of the invention is the use of the additive to generate foam able to condition excavation soils. The additive is preferably added, in percentages ranging from 0.1 to 4.0% by weight, to the water pumped into a foam generator.

The characteristics and advantages of the additive according to the invention are more particularly described in the examples below. The percentages of the ingredients are expressed by weight.

Example 1

The foaming additives have the following compositions:

TABLE 1

| composition of samples | | | | |
|---|---|---|---|---|
| | Parts by weight (%) | | | |
| | Sample 1 | Sample 2 | Sample 3 | Sample 4 |
| Sodium lauryl ether sulphate | 20.0 | 20.0 | 20.0 | 12.0 |
| Xanthan gum | 0.0 | 0.5 | 2.0 | 0.3 |
| Biocide | 0.2 | 0.2 | 0.2 | 0.2 |
| Water | 79.8 | 79.3 | 77.8 | 87.5 |

The stability of the foam generated by an aqueous solution prepared by adding 2% by weight of foaming additive to 5000 g of water is evaluated. The stability is expressed as the half-life, which indicates the time required for the weight of the foam to halve. The test is conducted by evaluating the time in which water amounting to half the weight/volume of the foam is released in a 250 ml cylinder.

The foam is formed by a generator that conveys the flow of liquid at a constant airflow into a glass ball mixer.

TABLE 2

| half-life | |
|---|---|
| | Half-life (sec) |
| Sample 1 | 540 |
| Sample 2 | 730 |
| Sample 3 | 1800 |
| Sample 4 | 690 |

The figures set out in Table 2 indicate that the stability of the foam increases when the dose of biopolymer is increased. The biological degradation results of sample 4 according to OECD 301 classify the product as readily biodegradable with a value of 84% after 28 days.

Example 2

The foaming additives have the compositions reported in Table 1.

The aggregate used to evaluate the stability of the conditioning is a standard quartz with a well-defined particle-size distribution curve (0.06-0.25 mm).

The foam used to condition the matrix is generated by mechanical mixing at 2000 rpm starting from an aqueous solution prepared with 65 g of water and 0.65 g of foaming additive.

The evaluation involves adding the foams generated with the foaming additives reported in Table 1 to three 1000 g samples of standard quartz, and homogenising the mixture in a Hobart mixer for 3 minutes at standard speed. The matrix conditioning is expressed as the viscosity value, measured with a Brookfield DV-I Prime viscometer, using spindle D and a speed of 5 rpm. The viscosity of the conditioned matrix is evaluated at time 0 and 60 minutes after mixing. A smaller difference in the values obtained after 60 minutes compared with the initial figure suggests better conditioning by the foam used.

The results are set out in Table 3:

TABLE 3

| viscosity of conditioned quartz. | | |
|---|---|---|
| | Viscosity (Pa*s) | |
| | 0 minutes | 60 minutes |
| Water | Not evaluatable | |
| Sample 1 | 145 | 325 |
| Sample 2 | 150 | 240 |
| Sample 3 | 145 | 200 |
| Sample 4 | 155 | 300 |

The test conducted with the addition of water alone gave rise to a cohesionless matrix; the viscosity measurement was not significant.

The data set out in Table 3 indicate an improvement in the stability of the soil conditioning when foams with long half-lives are used.

Example 3

The foaming additives have the following compositions:

TABLE 4

| composition of samples | | | |
|---|---|---|---|
| | Parts by weight (%) | | |
| | Sample 5 | Sample 6 | Sample 7 |
| Sodium lauryl ether sulphate | 15.0 | 15.0 | 15.0 |
| Guar gum | 0.0 | 0.1 | 0.5 |
| Water | 85.0 | 84.9 | 84.5 |

The stability of the foam generated by an aqueous solution prepared by adding 2% by weight of foaming additive to 5000 g of water is evaluated. The stability is expressed as the half-life, which indicates the time required for the weight of the foam to halve. The test is conducted by evaluating the time in which water amounting to half the weight/volume of the foam is released in a 250 ml cylinder.

The foam is formed by a generator using a constant airflow.

TABLE 5

| half-life | |
|---|---|
| | Half-life (sec) |
| Sample 5 | 480 |
| Sample 6 | 530 |
| Sample 7 | 560 |

The figures set out in Table 5 indicate that the stability of the foam increases when the dose of biopolymer is increased.

Example 4

The foaming additives have the following compositions:

TABLE 6

| composition of samples | | | | | |
|---|---|---|---|---|---|
| | Parts by weight (%) | | | | |
| | Sample 8 | Sample 9 | Sample 10 | Sample 11 | Sample 12 |
| Sodium lauryl ether sulphate | 10.0 | 10.0 | 0.0 | 0.0 | 5.0 |
| Sodium lauryl sulphate | 0.0 | 0.0 | 10.0 | 10.0 | 0.0 |
| Cocamide MEA | 0.0 | 0.0 | 0.0 | 0.0 | 5.0 |
| Guar gum | 0.1 | 5.0 | 0.0 | 0.5 | 0.5 |
| Water | 89.9 | 85.0 | 90.0 | 89.5 | 89.5 |

The stability of the foam generated by an aqueous solution prepared by adding 2% by weight of foaming additive to 5000 g of water is evaluated. The stability is expressed as the half-life, which indicates the time required for the weight of the foam to halve. The test is performed by evaluating the time in which water amounting to half the weight/volume of the foam is released in a 250 ml cylinder.

The foam is formed by a generator that conveys the flow of liquid at a constant airflow into a glass ball mixer.

TABLE 7

| half-life | |
|---|---|
| | Half-life (sec) |
| Sample 8 | 600 |
| Sample 9 | 7200 |
| Sample 10 | 450 |
| Sample 11 | 860 |
| Sample 12 | 650 |

The figures set out in Table 7 indicate that the stability of the foam increases when the dose of biopolymer in the additive is increased.

Example 5

The foaming additives have the following compositions:

TABLE 8

| composition of samples | | | |
|---|---|---|---|
| | Parts by weight (%) | | |
| | Sample 13 | Sample 14 | Sample 15 |
| Sodium lauryl ether sulphate | 12.0 | 12.0 | 12.0 |
| Xanthan gum | 0.0 | 0.3 | 2.0 |
| Water | 88.0 | 87.7 | 86.0 |

The stability of the foam generated by an aqueous solution prepared by adding 2% by weight of foaming additive to 5000 g of brine is evaluated. The brine used is characterised by a sodium chloride concentration of 2%. The stability is expressed as the half-life, which indicates the time required for the weight of the foam to halve. The test is conducted by evaluating the time in which water amounting to half the weight/volume of the foam is released in a 250 ml cylinder.

The foam is formed by a generator that conveys the flow of liquid at a constant airflow into a glass ball mixer.

TABLE 9

| half-life | |
|---|---|
| | Half-life (sec) |
| Sample 13 | 510 |
| Sample 14 | 650 |
| Sample 15 | 1720 |

The figures set out in Table 9 indicate that the stability of the foam generated by a brine solution increases when the quantity of biopolymer in the additive is increased.

Example 6

The foaming additives have the following compositions:

TABLE 10

| composition of samples | | |
|---|---|---|
| | Parts by weight (%) | |
| | Sample 16 | Sample 17 |
| Sodium lauryl ether sulphate (ethoxylation number 2) | 10.0 | 1.0 |

TABLE 10-continued composition of samples

| | Parts by weight (%) | |
|---|---|---|
| | Sample 16 | Sample 17 |
| Sodium alkyl ether sulphate (ethoxylation number 7) | — | 10.0 |
| Xanthan gum | — | 0.3 |
| Water | 90 | 88.7 |

The stability of the foam generated by an aqueous solution prepared by adding 2% by weight of foaming additive to 5000 g of brine is evaluated. The stability is expressed as the half-life, which indicates the time required for the weight of the foam to halve. The test is conducted by evaluating the time in which water amounting to half the weight/volume of the foam is released in a 250 ml cylinder.

The foam is formed by a generator that conveys the flow of liquid at a constant airflow into a glass ball mixer.

TABLE 11

Half-life

| | Half-life (sec) |
|---|---|
| Sample 16 | 450 |
| Sample 17 | 560 |

The figures set out in Table 11 show a stable foam when a sodium alkyl ether sulphate characterised by an ethoxylation number of 7 is used as surfactant.

The invention claimed is:

1. Method of conditioning excavated soil with a liquid foaming additive containing 5-40% by weight of one or more surfactants, 0.01-5% by weight of one or more biopolymers and 55-94.99% by weight of water, said method comprising:
adding said liquid foaming additive to an excavation chamber of a tunnel boring machine, and
conditioning said excavated soil.

2. The method according to claim 1 wherein the additive is added, in percentages ranging from 0.1 to 4.0% by weight, to water pumped into a foam generator.

* * * * *